United States Patent [19]

Steenstra et al.

[11] Patent Number: 5,649,179
[45] Date of Patent: Jul. 15, 1997

[54] DYNAMIC INSTRUCTION ALLOCATION FOR A SIMD PROCESSOR

[75] Inventors: Mark Evan Steenstra, Mesa, Ariz.; John Bartholomew Gehman, Jr., Trophy Club, Tex.; Ascencion Chapapro Acosta, Jr., Mesa, Ariz.

[73] Assignee: Motorola, Inc., Schaumburg, Ill.

[21] Appl. No.: 444,637

[22] Filed: May 19, 1995

[51] Int. Cl.$^6$ .................................................. G06F 15/00
[52] U.S. Cl. .......................... 395/598; 395/800; 395/385; 395/595
[58] Field of Search .......................... 345/800; 395/379, 395/385, 595, 598, 388

[56] References Cited

U.S. PATENT DOCUMENTS

| | | | |
|---|---|---|---|
| 4,101,960 | 7/1978 | Stokes | 395/800 |
| 4,236,204 | 11/1980 | Groves | 395/567 |
| 4,591,981 | 5/1986 | Kassabov | 395/800 |
| 4,771,376 | 9/1988 | Kamiya | 395/389 |
| 4,791,559 | 12/1988 | Byers | 395/500 |
| 4,835,679 | 5/1989 | Kida et al. | 395/388 |
| 4,992,933 | 2/1991 | Taylor | 395/800 |
| 5,155,819 | 10/1992 | Watkins et al. | 395/375 |
| 5,376,825 | 12/1994 | Tukamoto et al. | 257/685 |
| 5,457,779 | 10/1995 | Harrell | 395/163 |
| 5,511,212 | 4/1996 | Rockoff | 395/88 |

Primary Examiner—Larry D. Donaghue
Attorney, Agent, or Firm—Jeffrey Nehr; Bradley J. Botsch, Sr.

[57] ABSTRACT

A method and apparatus to dynamically allocate instructions to programmable processing element decoders (78, 79, 80) in a SIMD processor (100) includes a source code instruction (71) for the processor is parsed (1) into components (75, 76, 77) that apply to specific processing elements (60, 61, 62). The components (75, 76, 77) are used to determine control signals (90, 91, 92) that must be generated from the processing element instruction decoders (50, 51, 52) in order to execute the given instruction. If a processing element instruction decoder (50, 51, 52) is not capable of producing the necessary control signals (90, 91, 92), the decoder (50, 51, 52) must be reconfigured to do so. Then the processing element instruction (75, 76, 77) that will generate the specified control logic can be determined and returned to the assembler or compiler so that the assembly or compilation of the program can be completed.

18 Claims, 4 Drawing Sheets

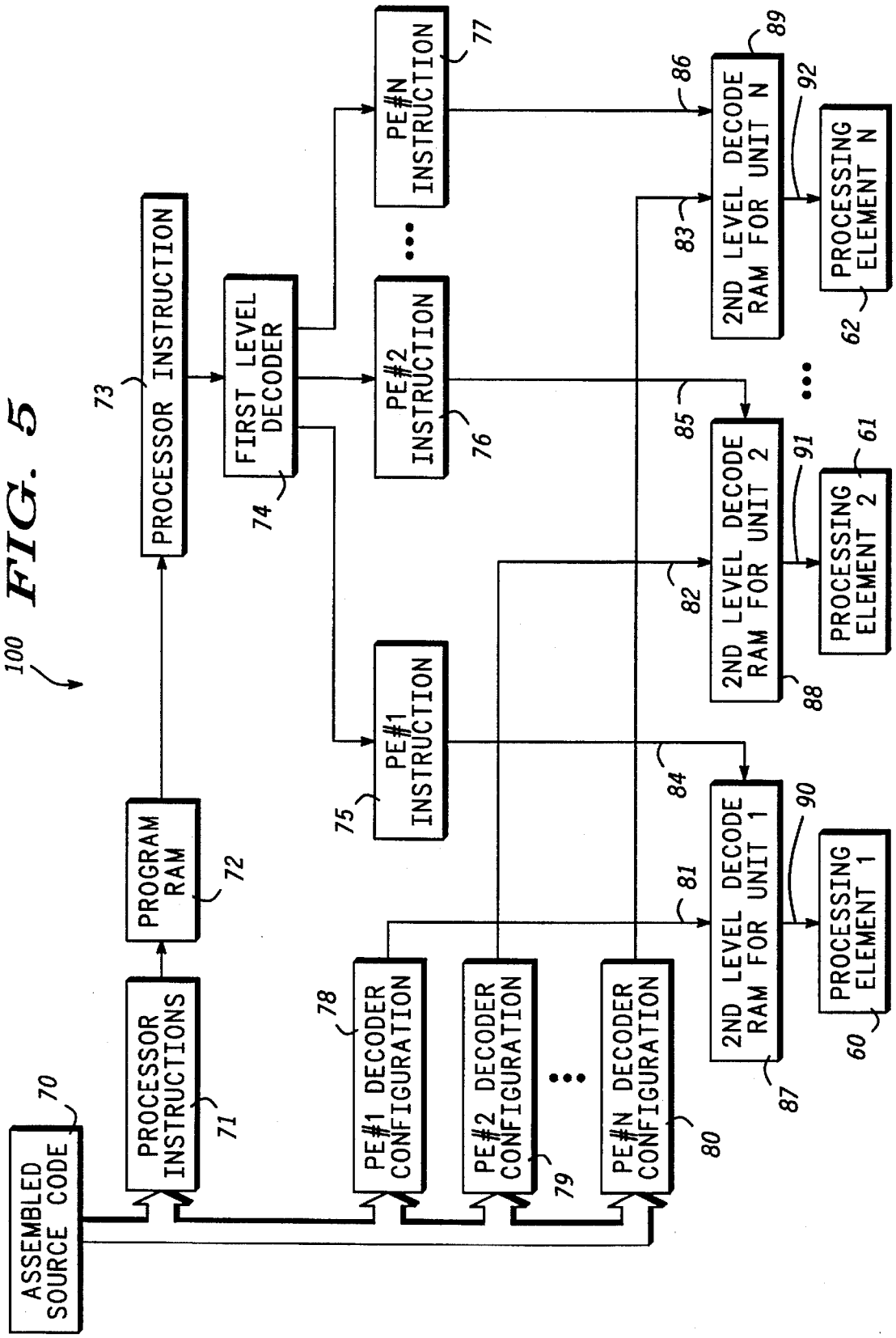

DYNAMIC INSTRUCTION ALLOCATION FOR A SIMD PROCESSOR

FIELD OF THE INVENTION

This invention relates in general to methods for controlling Single Instruction Multiple Data (SIMD) processors and in particular to methods for dynamically allocating instructions to processing elements within a SIMD processor.

BACKGROUND OF THE INVENTION

Parallel processors are becoming increasingly important because of limitations in clock speed and the need to reduce power consumption by computing resources. One challenging aspect of parallel processor design is providing distributed control to multiple processing elements from a single program. In some cases, SIMD processors distribute control to multiple processing resources through a single, usually wide, instruction word. The disadvantage of wide instruction words is that program memory is increased proproportionally to the instruction bit width, which in turn increases power consumption and cost.

Conventional methods for reducing the width of the instruction word include processing element decoders which allow the digital control logic to "tree out" at the expense of limiting the size of the instruction set for the processing elements. The general advantage of using processing element decoders is that the SIMD instruction word does not have to include all of the digital control logic for each processing element, and therefore the width of the SIMD instruction word is substantially shorter. The specific advantages of processing element decoding include increased program memory efficiency and increased routability.

However, unmodifiable processing element decoders also have a serious disadvantage. While all possible combinations of control lines are not required, the size limitation of the instruction set may be too restrictive. This is particularly true in the case of cross bar switches which may have a very large number of combinations. Crossbar switches are required in general purpose parallel processors to provide the necessary signal routing. A limited instruction set can therefore severely restrict the allowable functions that can be performed by the processing elements. Flexibility can be greatly increased by allowing the processing element decoders to be configured using an instruction decoder control specification. Currently, no methods exist for dynamically allocating instructions to these stores upon assembly or compilation of a program targeted for a SIMD processor.

Thus, what is needed is a method for programming SIMD processors without resorting to wide program words, while still maintaining the flexibility to perform all the functions supported by the processing elements in the processor. In order to achieve this result, a method is needed to dynamically allocate instructions to programmable processing element decoders within a SIMD processor.

DETAILED DESCRIPTION OF THE PREFERRED EMBODIMENTS

Accordingly, it is an advantage of the present invention to provide a new and improved method for programming and controlling SIMD processors. It is further an advantage of the present invention to provide a method to reduce the size of the processing element instruction decoders.

Figure 1:
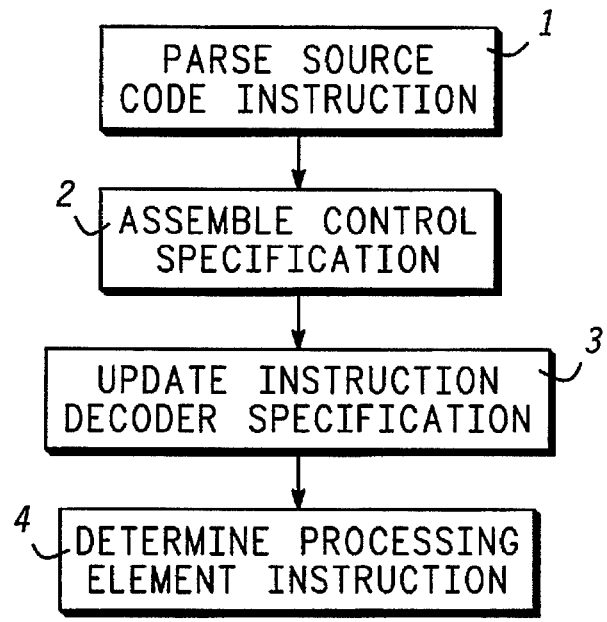
In FIG. 1, there is shown a flowchart of a method for dynamically allocating instructions to processing elements in a SIMD processor in accordance with a preferred embodiment of the invention.

This disclosure includes a method used to allocate instructions to the processing element (PE) decoder RAMs. As shown in FIG. 1, the first step 1 of this method is to parse a source code instruction targeted for the SIMD processor into components that effect the operation of a given processing element within the processor. In step 2, the components are assembled into a control specification for the processing element decoder. Step 2 is further broken down into steps as illustrated in FIG. 2.

Figure 2:
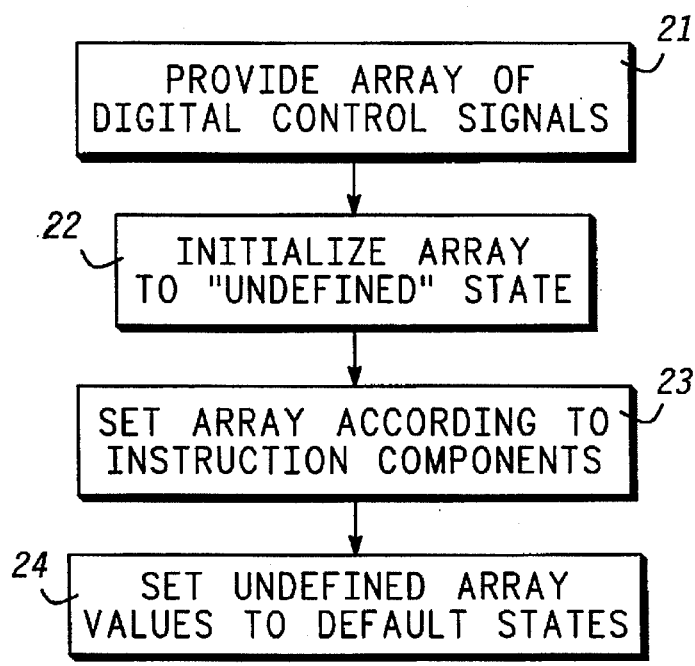
In FIG. 2, there is shown a flowchart of a method for assembling a control specification for a processing element instruction decoder based on instruction components that apply to the processing element in accordance with a preferred embodiment of the invention.

In step 21 of FIG. 2, an array is created that represents the states of the digital control signals used to control the PE resources. Each bit or group of bits used to control the PE resources is represented by an element in this array. The array is initialized to a value indicating that the elements in the array have not yet been defined. The symbol "U" can be used for this purpose (step 22). Next (step 23), the elements of the array are set to either a logical one ("1"), a logic zero ("0"), a don't care condition ("X"), or they are left alone ("U") according to the PE instruction components.

As an example of how an array is created by the process just discussed, if one of the components of the instruction requires that a four input mux control line be set to the value 2, the field in the array representing the PE digital control word used to control the mux is set to "10" (binary notation). If the state of the control lines to another four input mux in the PE does not affect the proper execution of the instruction, this field in the array is set to "XX". The XX's allow decoder instruction reuse which provides for more efficient use of the processing element decoder. Finally, if a register in the PE is not affected by the instruction, the field in the array corresponding to the register would be left as a "U".

As each of the components of the instruction applying to the PE are assembled, the elements of the array are updated. If an element in the array is already set to a one, and the instruction component calls for it to be set to a zero, an assembly error is generated. Similarly, if an element in the array is already set to a zero and is to be changed to a one, an assembly error is generated. If the element is set to either a "U" or a "X", and an instruction component calls for it to change a one or a zero, then the element is so changed.

The resolution function dictating the values of the elements in the array are defined in table 1 below. The current value of the array is listed in the first column, and the new value determined for the array from the instruction component is listed in the top row.

TABLE 1

Resolution Function for Digital Control Signal Array

| Current Values | | New Values | |
|---|---|---|---|
|   | 1 | 0 | X |
| 1 | 1 | ERROR | 1 |
| 0 | ERROR | 0 | 0 |
| X | 1 | 0 | X |
| U | 1 | 0 | X |

When all of the instruction components applying to the PE are processed, any of the elements of the array that are left undefined are set to the inert or default state for that particular control line. For example, if an array element representing a control line that controls whether a register is to be loaded or not (1=load) is undefined after all of the instruction components are processed, then that line is set to a zero ("0") so that the register will remain unchanged. Therefore, zero is the inert state for that particular control line. When all instruction elements have been processed and the undefined elements of the array have been set to the inert or default state, the array becomes the control specification for the PE.

In step 3 of FIG. 1, the control specification generated in step 2 is used to update the instruction decoder configuration. When RAMs or other storage elements are used to implement the PE instruction decoders, a table representing the digital control words stored in the decoder store is used to configure the PE instruction decoder (step 31, FIG. 3). This table will be referred to as the PE instruction decoder configuration file.

Figure 3:
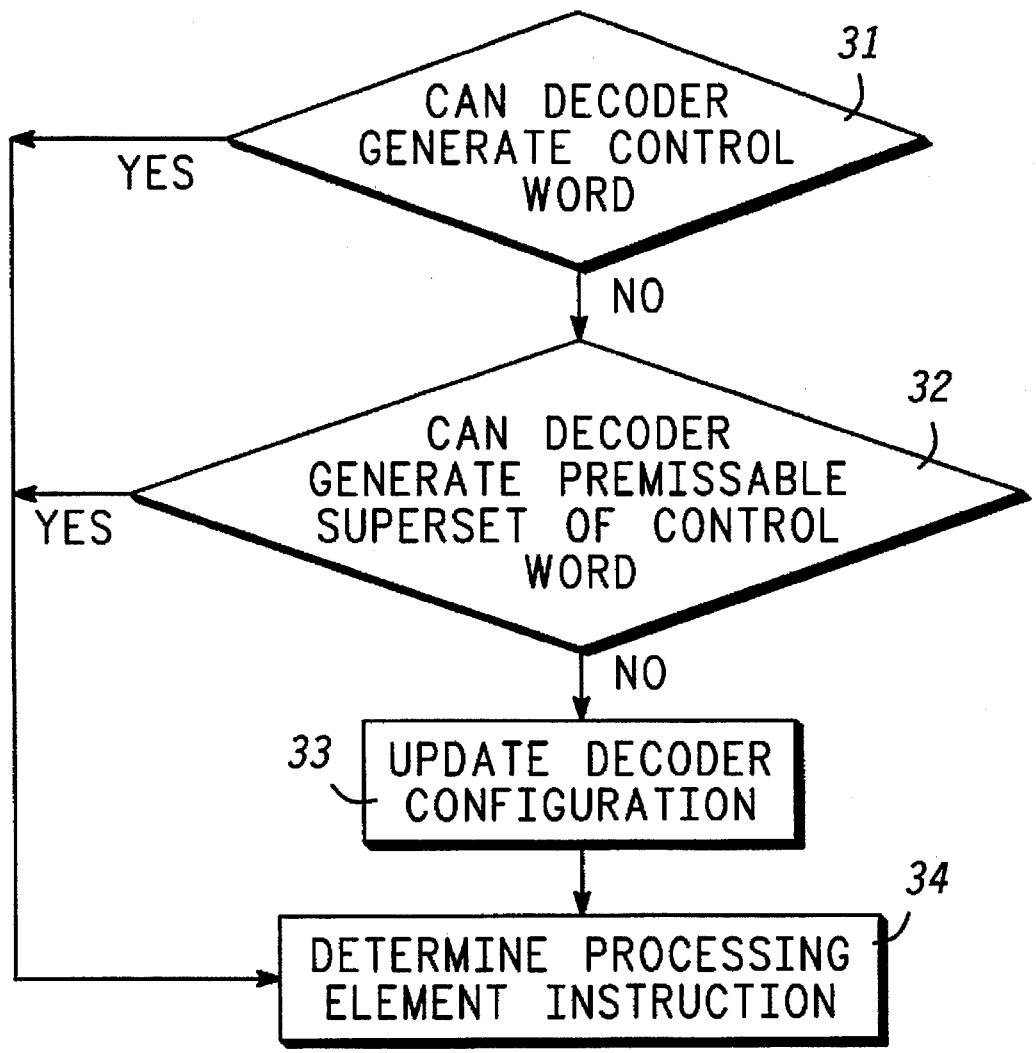
In FIG. 3, there is shown a flowchart of a method for updating an instruction decoder configuration based on the processing element control specification in accordance with a preferred embodiment of the invention.

In FIG. 3, step 31, the configuration file is searched to see if it contains the control word specified by the control specification. In this step, all elements of the array must be identical except for elements in the control specification that are set to "X". For example, if the control specification array is {1X0X}, then the control word {1100} would be considered a "match", whereas the control word {0000} would not. If a match is found, step 3 of FIG. 1 is completed. The location of the control word in the PE instruction decoder configuration file is passed back to the assembler and used to generate the processing element instruction (step 4 of FIG. 1). However, if there is no matching control word in the table, the PE instruction decoder configuration file is analyzed to see if it contains a user defined superset of the PE control specification (step 32 of FIG. 3).

A control word is a superset of the control specification if it performs all of the actions specified by the specification and also performs some additional actions. In some cases, these additional actions may be acceptable. For example, an intent of a particular instruction (instruction 1) may be to update register "A". The control specification generated using step 2 of FIG. 1 will specify that only register "A" is to be loaded. If there is a register "B" in the PE, the control specification would specify that it remain unchanged. However, the user may not be using the value in register "B". If the user configures the assembler so that it knows it is acceptable to allow side effects to corrupt the value in register "B", then the instruction that updates registers "A" and "B" (instruction 2) is an allowable superset of instruction 1 as defined by the user. If this is the case, instruction 2 may be used to perform the actions specified by instruction 1. Therefore, the location of the control word associated with instruction 2 in the PE instruction decoder configuration file is passed back to the assembler and used to generate the processing element instruction for instruction 1 (step 4 in FIG. 1).

If no permissible superset of the control specification is located in step 32 of FIG. 3, then the PE instruction decoder configuration file is updated (step 33 of FIG. 3). This update may be accomplished by appending the array defined by the control specification to the end of the PE instruction decoder configuration file. Any elements of the array that contained "X" values are then converted to the inert of default value for the corresponding digital control lines. The location of this control word is then passed back to the assembler and used by the assembler to imbed the processing element instruction into the SIMD processor machine level instruction.

It is also possible to implement the PE instruction decoders using programmable logic, in which case the PE instruction decoder is referred to as a programmable logic decoder. In the case of a programmable logic decoder, step 3 in FIG. 1 is handled somewhat differently than described above. The PE instruction decoder configuration is accomplished using a configuration file that controls the operation of the programmable logic decoder. Step 31 in FIG. 3 is accomplished by analyzing the configuration file to determine if the programmable logic decoder is capable of generating the PE control word when configured as specified by the configuration file (step 31 in FIG. 3). Although the details of the method described in the paragraphs above address PE instruction decoders implemented using storage elements such as RAMs, these methods can also be applied in general to PE instruction decoders implemented using programmable logic.

The present disclosure applies to a generalized SIMD architecture that is implemented using processing element (PE) instruction decoders. The decoders must be reconfigurable to apply this method to the SIMD architecture and achieve the benefits realized by this method. One such embodiment of this architecture is shown in FIG. 4, where RAMs are used as the PE instruction decoders.

Figure 4:
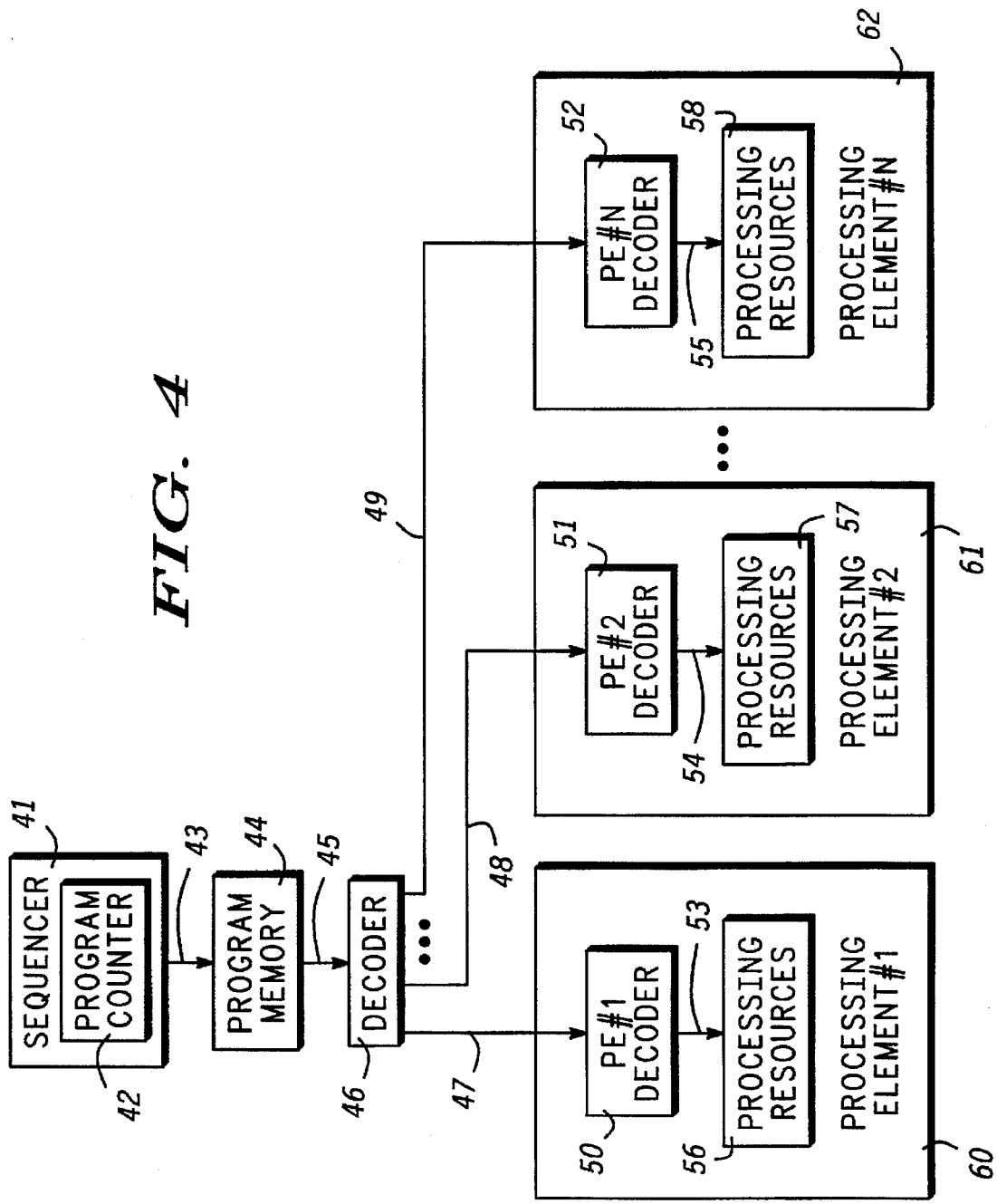
In FIG. 4, there is shown a schematic of a generalized architecture for a SIMD processor that is implemented using processing element instruction decoders in accordance with a preferred embodiment of the invention; and In FIG. 5, there is shown a schematic of the structure supporting the method of dynamically allocating instructions to processing elements in a SIMD processor in accordance with a preferred embodiment of the invention.

In FIG. 4, there is shown a schematic of a generalized SIMD processor architecture with PE decoders. Sequencer 41, including program counter 42, provides instruction addresses 43 to program memory 44. Program memory 44 provides processor instructions 45 to decoder 46. Decoder 46 sends PE instructions to each of processing element #1 (60), processing element #2 (61), and so on through processing element #N (62); specifically, PE instruction #1 (47) goes to PE #1 decoder 50 of processing element #1 (60), PE instruction #2 (48) goes to PE #2 decoder 51 of processing element #2 (61), and PE instruction #N (49) goes to PE #1 decoder 52 of processing element #N (62). PE#1 decoder 50, PE#2 decoder 51, and PE#N decoder 52 provide digital control signals 53, 54, and 55, respectively, to processing resources 56, 57, and 58, respectively.

In FIG. 5, there is shown an implementation of the present method using processing element decoder stores in SIMD processor 100. Assembled source code 70 provides processor instructions 71 to program RAM 72, and PE#1 decoder configuration 78, PE#2 decoder configuration 79, and so on through PE#N decoder configuration 80. Program RAM 72 provides processor instructions 73 to first level decoder 74. First level decoder 74 provides PE #1 instruction 75, PE#2 instruction 76 and so on through PE#N instruction 77. PE #1 instruction 75, PE#2 instruction 76 and so on through PE#N instruction 77, ad addresses 84, 85, and 86, respectively, enter second level decode RAM 87, 88, and 89. At the same time, PE#1 decoder configuration 78 provides input data 81 to second level decode RAM 87, PE#2 decoder configuration 79 provides input data 82 for second level decode RAM 88, and PE#N decoder configuration 80 provides input data 83 to second level decode 89. Second level decode RAM 87, 88, and 89 produce PE#1 control output data 90, PE#2, control output data 91, and PE#N control output data 92, respectively, to processing element 1 (60), processing element 2 (61), and processing element N (62).

Thus, FIG. 5 illustrates a SIMD processor 100 which includes processing elements (70, 71, 72), processing element instruction decoders (87, 88, 89), and processing element instruction decoder reconfigurers (60, 61, 62) which map instructions targeted at the processing element instruction decoders (87, 88, 89) into program RAM 72. The processing element instruction decoders (87, 88, 89) can include a decoder store load table representing a plurality of unique stored control words (90, 91, 92). The processing element instruction decoders (87, 88, 89) can include a configuration file that controls operation of a programmable logic decoder as well.

Functionally, the PE instruction set needed to execute a given program is determined by the assembler when the source code targeted for the SIMD processor is assembled. When the assembled SIMD program is loaded into the program memory, the PE decoder RAMs are also updated so that they contain all the digital control signals needed to execute the program. The operation of loading the instructions into the PE decoders is simplified by mapping the decoder RAMs into program memory space. Therefore the program and decoder instructions can be loaded in the same operation. Upon execution of the SIMD instruction word, the SIMD instruction is converted into multiple instruction pointers for each PE in the processor. These instruction pointers are then used to address the actual instructions for each PE.

Thus, a method to dynamically allocate instructions to processing elements within a SIMD processor has been described which overcomes specific problems and accomplished certain advantages relative to prior art methods and mechanisms. The improvements over known technology are significant. The dynamic allocation of instructions to processing elements in a SIMD processor is advantageous because it provides programming flexibility. Because the processing element instruction decoders can be reconfigured, any and all combinations of control signals can be produced by the decoders, even though the processing element instruction may be limited to a finite set of instructions. Therefore the SIMD processor instruction word length can be minimized while maintaining programming flexibility. Furthermore, the complexity and size of the processing element decoders can be minimized because they need to produce only the control signals needed by the program being executed by the SIMD processor, and do not need to provide the generalized control for all possible programs. The specific advantages of these methods are minimized power consumption and die area requirements for the SIMD processor very large scale integration (VLSI) device.

Thus, there has also been provided, in accordance with an embodiment of the invention, a method for dynamic instruction allocation that fully satisfies the aims and advantages set forth above. While the invention has been described in conjunction with a specific method, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A method of dynamically allocating a processing element instruction to a processing element in a single instruction multiple data (SIMD) processor, comprising the steps of:

parsing a source code instruction for the SIMD processor into components applicable to the processing element instruction;

assembling the components into a control specification for the processing element;

updating an instruction decoder configuration according to the control specification if necessary for the processing element; and determining the processing element instruction for the processing element.

2. A method as claimed in claim 1, wherein the step of assembling comprises the step of providing an array representing the control specification, such that elements of the array represent digital control signals for the processing element.

3. A method as claimed in claim 2, wherein the step of assembling further comprises the step of initializing all of the elements of the array to a symbol representing that values of the elements are undefined.

4. A method as claimed in claim 3, wherein the step of assembling further comprises the step of setting values of the elements to a logical one, logical zero, or logical X, where the logical X can be either the logical one or the logical zero, according to the components parsed from the source code instruction, such that the source code instruction will be executed.

5. A method as claimed in claim 1, wherein the step of assembling further comprises the step of setting default values for elements that remain undefined.

6. A method as claimed in claim 1, wherein the step of updating comprises the step of determining if the instruction decoder configuration must be modified in order to generate a control word according to the control specification.

7. A method as claimed in claim 6, wherein the step of updating further comprises the step of determining if the instruction decoder configuration must be modified in order to generate the control word according to a user defined superset of the control specification.

8. A method as claimed in claim 7, wherein the step of updating further comprises the step of updating the instruction decoder configuration if necessary.

9. A method as claimed in claim 8, wherein the step of determining if the instruction decoder configuration must be modified in order to generate the control word according to the control specification comprises the step of determining if a decoder store load table representing a plurality of unique control words that are stored in a decoder store contains the control word.

10. A method as claimed in claim 8, wherein the step of determining if the instruction decoder configuration must be modified in order to generate the control word according to the control specification comprises the step of determining if a programmable logic decoder is capable of generating the control word when configured using a configuration file that controls the operation of a programmable logic decoder.

11. A single-instruction multiple-datapath (SIMD) processor comprising:

processing elements;

processing element instruction decoders; and processing element instruction decoder reconfigurers which map instructions targeted at the processing element instruction decoders.

12. A processor as claimed in claim 11, wherein the processing element instruction decoders comprise a decoder store load table representing a plurality of unique stored control words.

13. A processor as claimed in claim 11, wherein the processing element instruction decoders comprise a configuration file that controls operation of a programmable logic decoder.

14. A method of dynamically allocating instructions to a programmable processing element decoder in a single instruction multiple data (SIMD) processor, the method comprising the steps of:

parsing a source code instruction for the SIMD processor into components applicable to the instructions;

assembling the components into a control specification for the programmable processing element decoder;

updating an instruction decoder configuration according to the control specification; and determining the instructions.

15. A method as claimed in claim 14, wherein the step of assembling comprises the steps of:

providing an array representing the control specification, such that elements of the array represent digital control signals;

initializing all of the elements of the array to a symbol representing that values of the elements are undefined;

setting values of the elements to a logical one, logical zero, or logical X, where the logical X can be either the logical one or logical zero, according to the components parsed from the source code instruction, such that the source code instruction will be executed; and setting default values for elements that remain undefined.

16. A method as claimed in claim 14, wherein the step of updating comprises the steps of:

determining if the instruction decoder configuration must be modified in order to generate a control word according to the control specification;

determining if the instruction decoder configuration must be modified in order to generate the control word according to a user defined superset of the control specification; and updating the instruction decoder configuration if necessary.

17. A method as claimed in claim 16, wherein the step of determining if the instruction decoder configuration must be modified in order to generate the control word according to the control specification comprises the step of determining if a decoder store load table representing a plurality of unique control words that are stored in a decoder store contains the control word.

18. A method as claimed in claim 16, wherein the step of determining if the instruction decoder configuration must be modified in order to generate a control word according to the control specification comprises the step of determining if a programmable logic decoder is capable of generating the control word when configured using a configuration file that controls the operation of a programmable logic decoder.

* * * * *